United States Patent [19]
Igarashi

[11] 4,361,855
[45] Nov. 30, 1982

[54] FAULT LOCATION METHOD IN MASS-STORAGE SYSTEM

[75] Inventor: Tsuyoshi Igarashi, Kawasaki, Japan

[73] Assignee: Fujigsu Limited, Kawasaki, Japan

[21] Appl. No.: 193,817

[22] Filed: Oct. 3, 1980

Related U.S. Application Data

[63] Continuation-in-part of Ser. No. 967,633, Dec. 8, 1978, which is a continuation-in-part of Ser. No. 109,509, Jan. 4, 1980, which is a continuation-in-part of Ser. No. 967,633, Dec. 8, 1978.

[30] Foreign Application Priority Data

Dec. 12, 1977 [JP]  Japan ............................... 52-148972

[51] Int. Cl.$^3$ ............................................. G11B 5/09
[52] U.S. Cl. ........................................ 360/39; 360/53
[58] Field of Search ............... 360/39, 53, 48; 371/21, 371/32

[56] References Cited

U.S. PATENT DOCUMENTS 3,439,331  4/1969  Brown et al. ......................... 360/53
4,209,809  6/1980  Chang et al. ......................... 360/53

Primary Examiner—Vincent P. Canney
Attorney, Agent, or Firm—Staas & Halsey

[57] ABSTRACT

A fault location method in a mass-storage system comprising a recording medium with a plurality of tracks and the main unit of the equipment providing a plurality of read/write heads corresponding to each track, in which a cause of a fault can be located with certainty in the recording medium side or in the equipment side through a diagnostic operation utilizing a currently used head.

10 Claims, 4 Drawing Figures

FAULT LOCATION METHOD IN MASS-STORAGE SYSTEM

RELATED APPLICATION

This application is a continuation-in-part of presently pending U.S. application Ser. No. 109,509, filed Jan. 4, 1980, which itself was a continuation-in-part of the then pending U.S. application Ser. No. 967,633, filed Dec. 8, 1978, and of which the subject application is also a continuation-in-part.

BACKGROUND OF THE INVENTION

1. Field of the Invention

Circuit arrangement and selected memory records allow locating the cause of a fault in the recording medium side or in the equipment side in a mass-storage system.

2. Description of the Prior Art

Generally, a magnetic disk pack unit is composed of a disk pack, which can be mounted or removed easily, and a main unit providing magnetic heads for reading or writing data from/to said disk pack, a modulator and demodulator, etc. If a fault occurs in such a magnetic disk pack unit, it is desirable to determine whether the fault lies in the main unit or in the disk pack. Various fault location methods are known.

The typical magnetic disk pack comprises plural magnetic disks piled with their center aligned in common, and both sides of each disk are used for magnetic recording.

Each recording medium surface generally includes plural cylindrical recording tracks and, for example, a series of cylinder addresses may be assigned in sequence from the inner to the outermost track. In addition, each recording medium surface is given a corresponding track address. Here, a "track" is used to specify one side of one magnetic disk, thus a recording medium surface, while a "recording track" specifies a cylindrical area within a recording medium surface or track. The reason why each recording medium surface is called a "track" is that it is an area to/from which data is written or read by only one head, which, as will be explained later, is analogous to a magnetic drum unit.

Each track (that is, each recording medium surface) is also divided into several "sectors". Therefore, each unit recording area is designated by a track address, a cylinder address and a sector address. This unit area is called a record. In a predetermined record in each recording track (cylindrical area) is stored the home address data of that recording track, and this home address data includes the track and cylinder addresses of the recording track itself.

The main unit of the magnetic disk pack provides a read/write head corresponding to each track, and all of these heads are arranged to move simultaneously as a single integrated assembly in the radial direction of the mounted disks. Also provided is the head selection circuit which selects only the head corresponding to a track address specified by a highly-ranked unit of the equipment, and the circuit connects the selected head to a modem.

A read/write operation for the record designated by the highly-ranked unit is performed as follows. First, the corresponding head is selected in accordance with the track address and the head moves from the outer recording track toward the inner tracks. The number of recording tracks which the head crosses are counted, and when the count equals the cylinder or recording track address value the head stops. The home address then passes below the head which is stopped at the addressed cylinder position, and the head reads out the track and cylinder addresses stored in the home address area. These are compared with the values specified by the highly-ranked unit for confirmation that they match. Then, for diagnostic purposes, either data that is stored in a predetermined sector address is subsequently read out after the home address data is sent to the highly-ranked unit, or data sent from the highly-ranked unit is written into a specified record.

A known method for fault location in such a unit is as follows.

First, record areas for diagnostic operation are provided on several tracks of the disk pack and the location of such diagnostic areas (track address, cylinder address, sector address) are recorded in a diagnostic area location record, for example, in the first sector of the first cylinder of the first track, which record might have the address of "0, 0, 0".

If a fault occurs (parity error, for example) during a read/write operation at a certain record, the read/write operation is generally attempted a second time after the disk makes a turn. If a fault occurs again the "0, 0, 0" record above is accessed to read out the addresses of the diagnostic areas.

If this read operation is performed successfully, then it is apparent that at least the demodulator circuit for the read operation is operative. Then, access is had to the first of the diagnostic areas according to the addresses read from the "0, 0, 0" record, and then some type of predetermined data is written there. Thereafter such data is read after the disk makes a turn and the data read out is compared with the data intended to be written, for confirmation. If these write and read operations are successfully performed, then it has been confirmed that the read/write circuits are operative. Further, proper operation of the head selection circuit can be examined by subsequently attempting similar write and read operations with the other diagnostic areas in other tracks. Thus, when normal operation of the entire main unit is confirmed, the cause of the fault can be assigned to the disk pack.

However, such known fault location methods have the following serious defect. Namely, a fault in a head cannot always be detected, if the cause of the fault lies in the head currently in use. In this case, a diagnostic area in the recording track corresponding to the defective head may not be properly written in the above-mentioned fault locating operation. Even if such a diagnostic test area is prepared in the relevant track, these tests are usually not performed in more than three tracks, so that defects in other heads may not be determinable. Thus, the diagnostic operation may be performed with different heads than the one in use when a fault is first detected. Thus, a defect in a head may not be detected. If diagnostic areas are provided in all the tracks and the write/read operations are attempted for all the heads when a fault occurs, a fault in a head can be detected. But, a longer diagnostic time is required and this method is not practical because of this disadvantage.

SUMMARY OF THE INVENTION

Thus, it is an object of the present invention to realize a diagnostic operation with the head that is being currently used, when a fault is detected in the mass-storage system having plural heads.

It is another object of the present invention to detect a fault in a head with certainty, and to prevent an operative disk pack from being erroneously diagnosed as defective.

It is another object of the present invention to perform a diagnostic operation within a short period of time.

It is a further object of the present invention to prevent the situation in which a normal disk pack is mounted on a unit which has a defective head in which an actual fault is masked and thereby the disk pack is damaged.

In the present invention, if a fault occurs during a read/write operation of a record, the home address area of the relevant recording track is read out with the same head from the same cylinder recording track and the track address is obtained. Then, access is had, for example, to the first record of the first cylinder of the first track to read the address of the diagnostic areas and to search for the diagnostic areas in the track in use when the fault occured, and the diagnostic write and read operations are performed for the relevant diagnostic area. Thereby, it can be prevented that a disk pack is erroneously judged as defective when a fault occurs instead in the corresponding head.

The preferred embodiment of the present invention will be explained in detail by referring to the drawings.

DETAILED DESCRIPTION OF THE PREFERRED EMBODIMENTS

Figure 1:
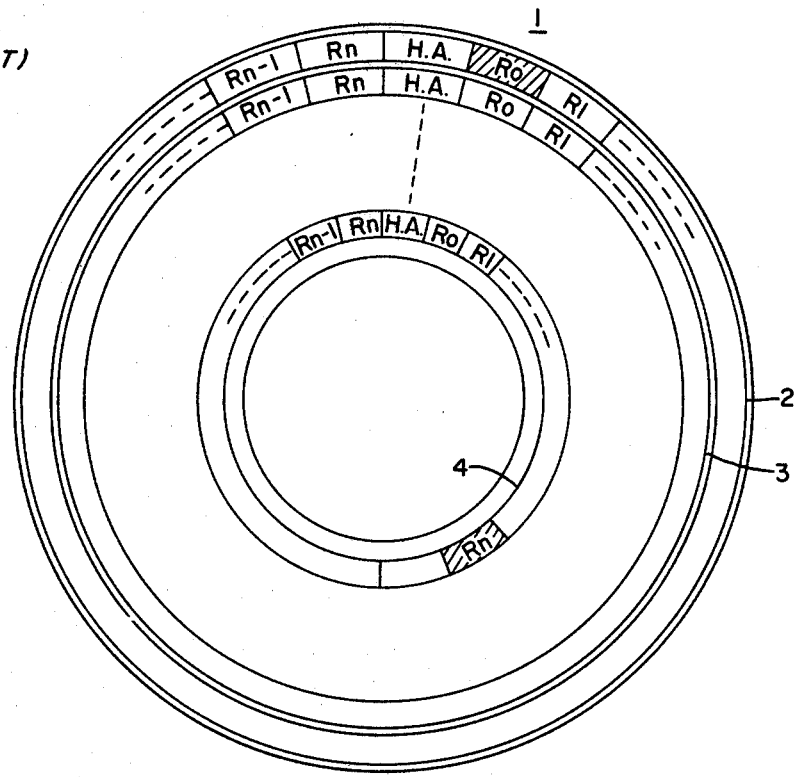
FIG. 1 shows a typical format in a recording medium of an ordinary disk pack unit.

FIG. 1 shows a recording medium of a disk pack, namely the magnetic recording area surface or track 1 and individual recording tracks 2, 3, 4. Each one of the recording tracks 2, 3, 4 is divided into plural sectors and each sector of each recording track has a unit recording area or record R0 to Rn. In a specified record area H.A. of each recording track, the home address data is written and this record area is not used for the read/write operations with the regular data. The home address data of each recording track includes the track and cylinder addresses of the respective recording track in which it is located. A disk pack comprises a plurality of such recording media. In the first record position R0, for example, of the first cylinder of the first track, are recorded the locations of the predetermined track, cylinder and sector addresses of the diagnostic areas which are selectively provided in advance in various records in the disk pack. In the preferred embodiment of the present invention, at least one diagnostic record area (Rn, for example) is provided in every track. These diagnostic record areas are not used for ordinary data read/write operations.

Figure 2:
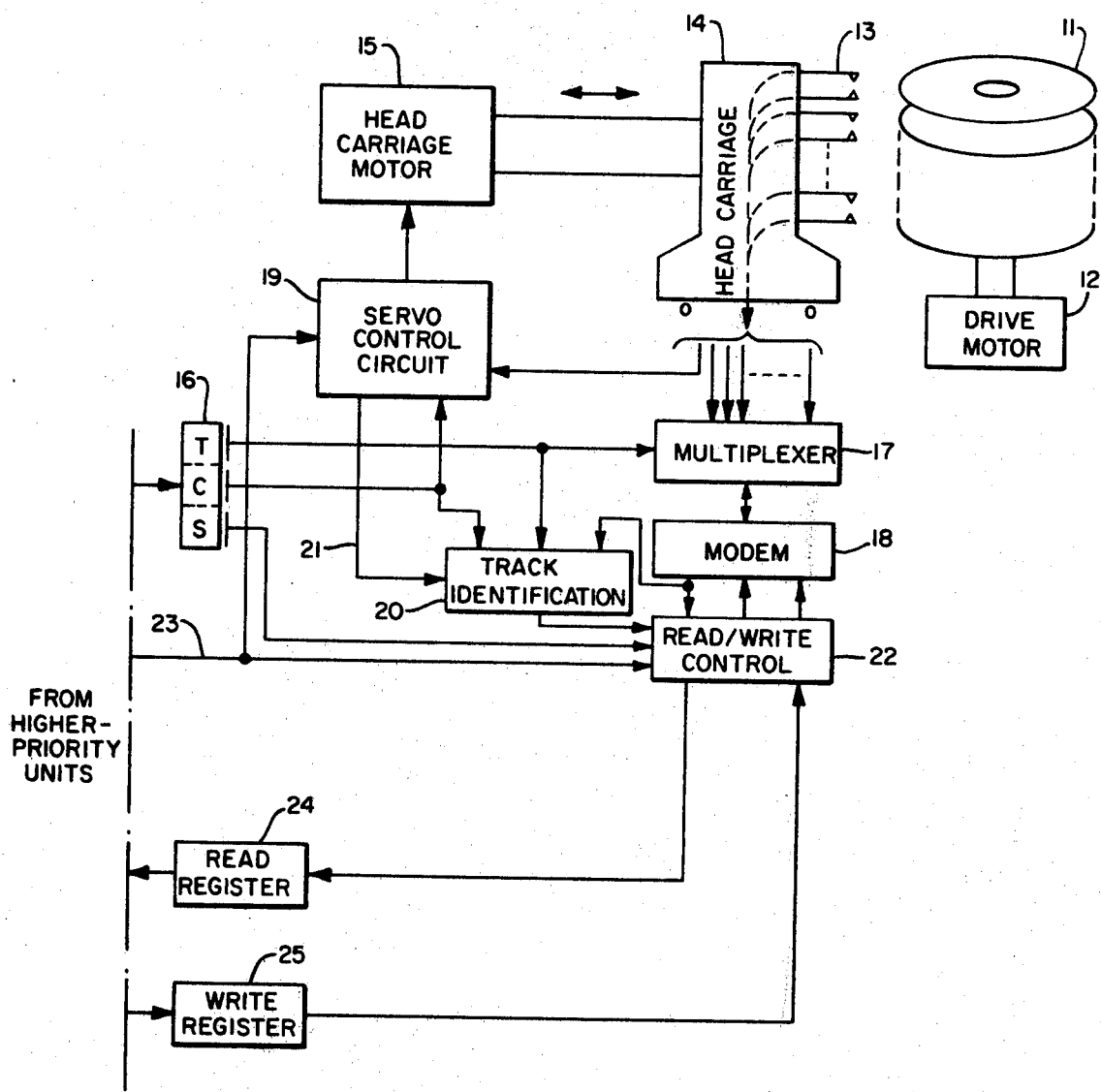
FIG. 2 is a block diagram of an ordinary disk pack unit.

FIG. 2 shows in block diagram an embodiment of the present invention employing a magnetic disk pack unit.

A disk pack 11 is driven at a constant speed by the drive motor 12, and magnetic heads 13 correspond to each of the recording medium surfaces (tracks) of the disk pack 11. Each head 13 is fixed to the head carriage 14 and the carriage 14 moves in the radial direction of the disks by means of the linear motor 15. An address register 16 receives the track address (T), cylinder address (C) and sector address (S) from the highly-ranked unit. Multiplexer means 17 connect one of the heads 13 to the modem 18 in accordance with the track address T. A servo control circuit 19 moves the heads 13 to the cylinder location designated by the cylinder address (C) by controlling the linear motor 15, and it holds the head on that cylinder recording track. This operation is called a "SEEK" operation. A specified disk surface in the disk pack 11 is not used as a recording medium, but is used for positioning the head 13 in accordance with the servo data previously written therein.

A recording track identification circuit 20 compares the track address T and cylinder address C specified by the highly-ranked unit with the track and cylinder addresses in the home address data which are actually read out from the head, when a timing signal is given on lead 21 from the servo control circuit 19 that the head is in position, to confirm that they are identical. This timing signal is also transmitted on control line 232 for informing the highly ranked unit of the timing of reading the home address.

A read/write control circuit 22 controls the read/write operations in accordance with commands from the control line 231, including the read/write designation for the record location corresponding to the sector address S given from the highly-ranked unit, when the identity signal is obtained from the identification circuit 20. The control line 233 provides a seek designation signal to the servo control circuit 19. A read register 24 holds data read from the disk pack 11, while write register 25 holds data received from the highly-ranked unit to be written into the disk pack 11.

Figure 3:
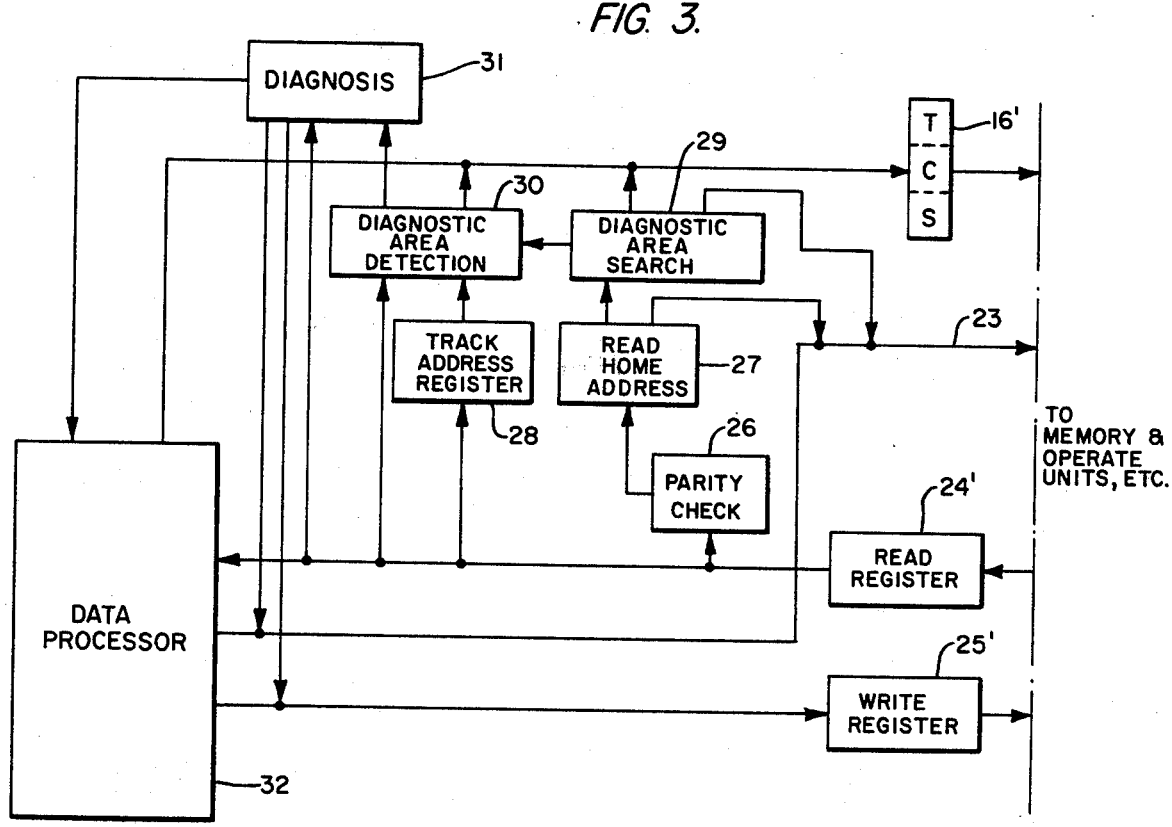
FIG. 3 shows a block diagram of a highly-ranked unit improved by one embodiment of the present invention.

FIG. 3 shows a block diagram of an embodiment of a highly-ranked unit according to the present invention. This shows the address register 16', the read register 24' and the write register 25' corresponding to components 16, 24, and 25 in FIG. 2. A parity check circuit 26 performs parity check of data read out to the read register 24'. The read home address circuit 27 issues the read designation signal to the line 231, when a flip-flop 271 receives a parity error signal from the parity check circuit 26, to command the reading of at least the track address from the home address data into the read register 24'. During this period, the head location is not changed even when the content of the address register 16' is changed. The track address that is read out designates the track in which the fault occurred and this address is input to the track address register 28. When the read home address operation is completed, the diagnostic area search circuit 29 sends a predetermined address to the address register 16' and issues the seek order and the read designation to the line 231. The flip-flop 271 is reset by a signal on control lead 232 from the servo control circuit 19.

An output of the flip-flop 271 is applied to control lead 231 as the read designation signal and simultaneously applied to OR gate 161, forcibly setting the sector address bits all to "1", for the case where the section address "11 . . . 1" designates the home address area.

The control lead 232 transmits the timing for reading the home address area, resets the flip-flop 271, causes the register 28 to hold the contents read out, and enables the box 29. The box 29 seeks the specific record R0, and when the addresses of the diagnostic areas are read out, the gate 302 is enabled.

According to the example explained above, this predetermined track, cylinder and sector address R0 is "0, 0, 0". The address of the diagnostic areas are sequentially read from the record area of address "0, 0, 0" to read registers 24'. From these addresses that are read out, at least one with a track address which is identical to that stored in the register 28 is selected by the diagnostic area detecting circuit 30. This selected address is input to the address register 16'.

This diagnostic area detecting circuit 30 comprises a comparator 301, and AND gates 302, 303. Addresses are sequentially read by enabling the gate 302 and are given to the comparator 301 for comparison with the content of register 28. However, this comparison is only for the track address. When matching is detected, the gate 303 is enabled and the current diagnostic area address (track, cylinder and sector) is given to the register 16' and the box 31 is enabled, to perform diagnostic operations using the address in the register 16'.

The diagnostic circuit 31 sends diagnostic data of some predetermined bit pattern to the write register 25' for writing into the relevant diagnostic area. Thereafter it reads back this diagnostic data written into the test area and checks its identity. The result of the diagnosis is transferred to the data processor 32 and a predetermined display and other processing are performed for the operator.

With respect to FIG. 3, the read home address circuit 27, the track address register 28, the diagnostic area search circuit 29, the diagnostic area detecting circuit 30 and the diagnostic circuit 31 can be formed in various ways by hardware circuits.

Figure 4:
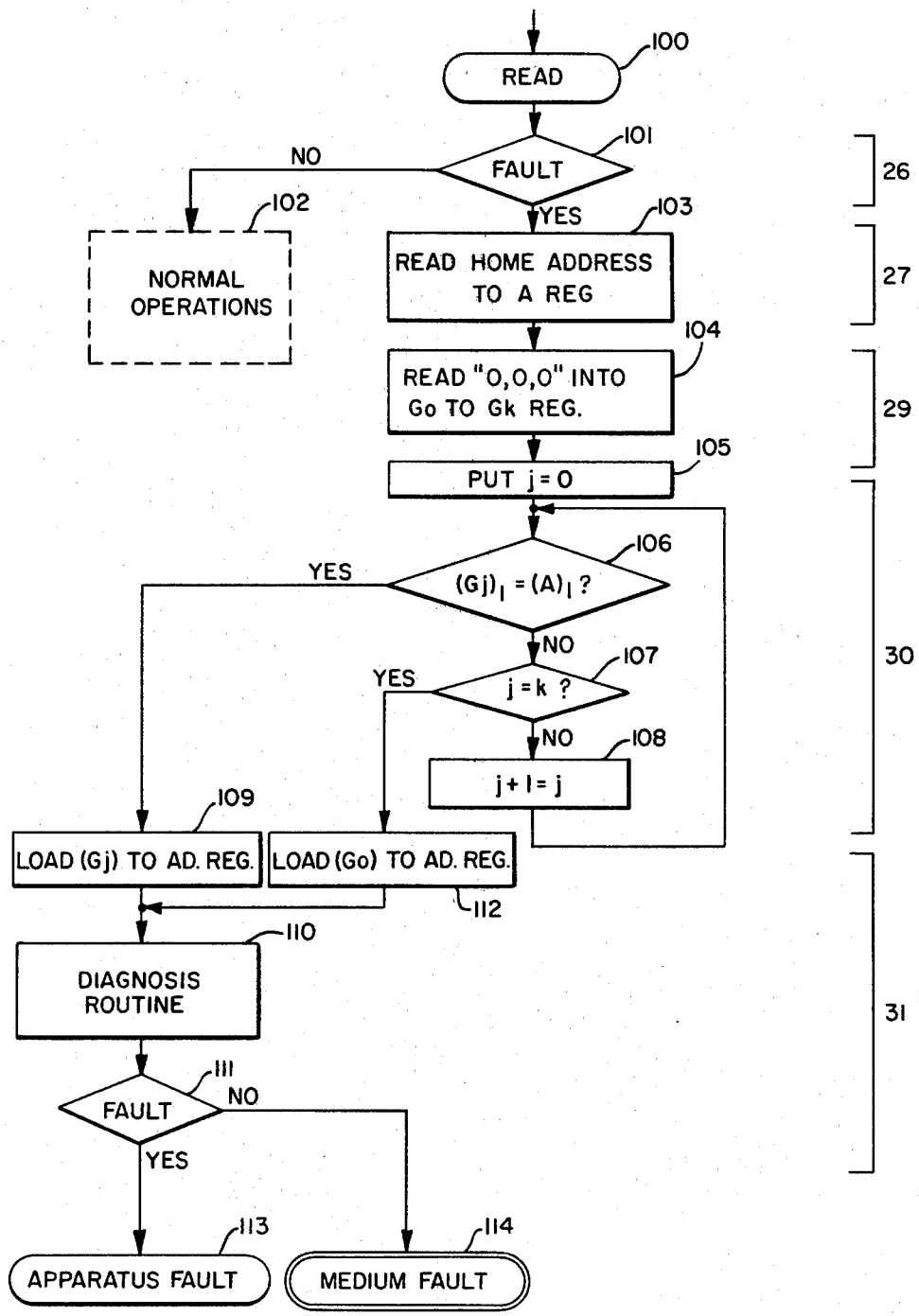
FIG. 4 shows a flow chart for realizing the diagnostic function of the present invention for the embodiment shown in FIG. 3.

The flow chart for the functions described in connection with the embodiment of FIG. 3 is shown in FIG. 4. The box 100 indicates an ordinary read operation and if a fault is not detected in the read out data, the processing proceeds to the normal operation of box 102. When a parity error occurs in box 101 for example, the "READ HOME ADDRESS" command is immediately issued in box 103 and the data that is read out is input to an "A" register (not illustrated). Then the contents of the address "0, 0, 0", namely of the first record of the first cylinder of the first track, is read out and this data is input to the general purpose registers G0 to Gk. Then, the value j is defined in the box 105 and its initial value is set to "0". In the box 106, the upper l bits of the general purpose register Gj and the upper l bits of A register are compared. Here, l is the number of bits of the track address. When both sets of bits coincide, processing proceeds to the box 109 and if they do not coincide, processing proceeds to the box 107. In the box 107, it is checked whether j and k coincide or not. When they coincide, processing proceeds to the box 112, and if they do not coincide, to the box 108. In the box 108, the value obtained by adding 1 to j is defined again as j and the processing returns to the box 106. When j=k is obtained in the box 107, it means that no diagnostic area is provided in the track of the relevant disk pack where a fault is detected. Therefore, in the box 112, the content of the general purpose register G0, namely the address of the first diagnostic area, is set to the address register and operation proceeds to the diagnosis routine 110 as in the known methods.

On the other hand, when the track addresses coincide in the box 106, the content of the general purpose register Gj, namely the address of the diagnostic area in the track corresponding to the head in use during initial detection of the fault is sent to the address register and then processing goes to the diagnostic routine 110.

In the diagnostic routine, a particular bit pattern, for example, a bit pattern designed to demonstrate any read error, is written into the record of the address held in box 109 or 112, and subsequently this same record is read out for comparison with this particular bit pattern that was intended to be written into that record. As a result of this diagnostic operation, if a fault occurs again, it may be the result of a fault in the unit including the head. If no fault occurs, it can be concluded that the previous fault was due to a fault in the recording medium.

A successful read operation of the home address, as shown in box 103, does not necessarily prove that the fault is not in the equipment side, since more accurate diagnostic processing may be required to draw such a conclusion and to determine the cause of a fault in the equipment side. For example, if the head is partially worn out or is contaminated by dust during the write operation, then the read operation may become unstable due to fluctuation of magnetization of the recorded data. If magnetization of the home address happens to be at a high level, then a normal read operation may be obtained.

The A register noted in the box 103 of FIG. 4 corresponds to the track address register 28 shown in FIG. 3. The numerals in the right side of FIG. 4 respectively correspond to the circuit blocks 26, 27, 29 to 31 in FIG. 3. For the registers A, G0 to Gk, and the circuits for comparison and identification, the general purpose hardware in the central processor unit can be used.

As explained above, according to the present invention, when a fault occurs with the head in a certain recording track, the address of the relevant track can be read by reading the home address stored in that same recording track before the head moves to another recording track. Therefore, since the diagnostic operation can be performed with the same head which is in use when a fault occurs, a defect in that head can be detected with certainty through the proper diagnostic routines using that head.

The embodiments described above have been explained with use of a magnetic disk pack. However, the present invention can also be applied to other memory units having plural read/write heads and different memory means, for example, such as a fixed magnetic disk unit or a magnetic drum unit.

In case the heads are fixed as in the case of a magnetic drum unit, then, if each head is regarded as corresponding to one of the "tracks", there is only one "recording track" per "track". Then only one home address area is required for each track and there is no cylinder address for the data in each home address area.

However, the present invention is most useful in a magnetic disk pack, which enables easy exchange of the recording medium.

What is claimed is:

1. A fault location method in a mass-storage system comprising (1) a recording medium having a plurality of tracks, each track having a home address area, for storing home address data comprising the track address, and at least one diagnostic area, and wherein the addresses of all said diagnostic areas are recorded in a predetermined record area in one of said tracks, and (2) a recording main unit having a data read/write head corresponding to each track, said method comprising storing the address of the track in use when a fault is detected by reading the content of said home address area of said track, reading the addresses of said diagnostic areas from said predetermined record area of said track where said addresses are stored, searching the track addresses of said diagnostic areas for selecting said diagnostic area in said track which was in use when said fault was detected, and executing diagnostic operations in said selected diagnostic area.

2. The fault location method of claim 1, said recording medium comprising a magnetic disk pack, each surface of each said disk comprising one of said tracks, each said track having plural cylindrical recording tracks, each said recording track comprising a home address area, said read/write heads moving in the radial direction of said disk as a single assembly for positioning selectively at said recording tracks.

3. A fault location method for a mass storage system comprising a recording medium divided into tracks and a main unit comprising a respective read/write head corresponding to each of said tracks, said method comprising storing at a predetermined location in each of said tracks the home address of that respective track, said home address comprising the respective track address, providing a diagnostic test area at a respective location in each of said tracks, storing in at least one predetermined location of at least one of said tracks the addresses of all said diagnostic areas of all said tracks, when a fault is detected during a read/write operation in a particular track, reading the home address area of that particular track and storing the track address of that particular track in said main unit, reading the addresses of all said diagnostic areas of all of said tracks from said at least one predetermined location of said at least one track, selecting the diagnostic test area within said particular track in use when said fault was detected, and applying diagnostic read/write operations to said selected diagnostic test area.

4. The method of claim 3 wherein said reading of said home address area in said particular track occurs before said main unit changes said read/write operation to another one of said tracks from said particular track.

5. The method of claim 4, said recording medium comprising a magnetic disk pack, each said track comprising one surface of each of said disks, each of said tracks comprising plural cylinder recording tracks, and all of said heads corresponding to said tracks moving together as a single assembly in the radial direction of said disks, storing said home address comprising the respective cylinder recording track address with said track address in each said cylinder recording track.

6. A diagnostic method in a mass storage system comprising a recording medium divided into tracks and a main unit comprising a respective read/write head for each of said tracks and a demodulator circuit for selecting one of said tracks for a selected read/write operation, said method having the object of distinguishing between a fault in said main unit from a fault in said recording medium, said method comprising reading the home address of the track that is the subject of a read/write operation when a fault is detected, said home address reading occurring before another track of said recording medium is selected for another read/write operation after said fault detection, verifying said home address that is read upon said fault detection to verify the read operation of the respective head and read circuitry of said main unit, reading from a predetermined area of a predetermined track the locations of plural diagnostic areas in said tracks, searching said addresses of said diagnostic areas for selecting one of said diagnostic areas that is located in said track being subjected to said read/write operation when said fault was detected, and writing predetermined diagnostic data into said selected diagnostic area for subsequent read out and verification of said writing of said predetermined data.

7. The method of claim 6 comprising providing each of said tracks with plural cylinder recording tracks storing said home address in each said cylinder recording track, said home address including the cylinder recording track address.

8. A mass storage system comprising means for determining the location of a fault, said system comprising plural tracks in a magnetic recording medium, each said track comprising a home address area for storing the home address of the respective track and a diagnostic area, an area in one of said tracks for storing the locations of all said diagnostic areas, a main unit comprising a read/write head for each of said tracks, a multiplexer for selecting one of said heads according to instructions from said main unit, a head carriage motor for moving all of said heads as a single integrated structure, a servo control circuit for controlling said head carriage motor, a modem for connecting said selected head for input/output of the corresponding track with said main unit, read and write registers for storing data for selective read/write operations within said tracks, fault detection means connected to one of said read registers for detecting a fault in one of said read operations, read home address means for reading and storing the home address of a track subject to a read operation when a fault is detected, diagnostic area search means for searching for said area of said track where said locations of said diagnostic areas are stored, and diagnostic areas detection means for locating said diagnostic area in the one of said tracks subject to said read operation when said fault is detected.

9. The system of claim 8, each of said tracks comprising plural cylinder recording tracks, each said cylinder recording track having stored therein said home address, each said home address comprising said track address and the respective recording track address, and said read home address means comprising means for reading the recording track address and track address of said track subject to said read/write operation when detecting said fault.

10. The system of claim 9,
said fault detection means comprising a parity check circuit having an output,
said read home address means comprising a flip-flop that is set when said fault is detected to signal said read/write means to read at least the track address of the home address of the cylinder recording track in use when said fault is detected, and
said diagnostic area detection means comprising means for consecutively comparing said addresses of said diagnostic test areas with said home address that is read upon said fault detection.

* * * * *

UNITED STATES PATENT AND TRADEMARK OFFICE
CERTIFICATE OF CORRECTION

PATENT NO. : 4,361,855
DATED : 30 November 1982
INVENTOR(S) : Tsuyoshi Igarashi

It is certified that error appears in the above-identified patent and that said Letters Patent is hereby corrected as shown below:

Front Page, [73] Assignee, "Fujigue Limited" should be --Fujitsu Limited--.

Signed and Sealed this

Third Day of July 1984

[SEAL]

Attest:

GERALD J. MOSSINGHOFF

Attesting Officer    Commissioner of Patents and Trademarks